Oct. 15, 1940.                W. G. BLAKE                   2,217,788
                         DYNAMOELECTRIC MACHINE
                           Filed June 29, 1939
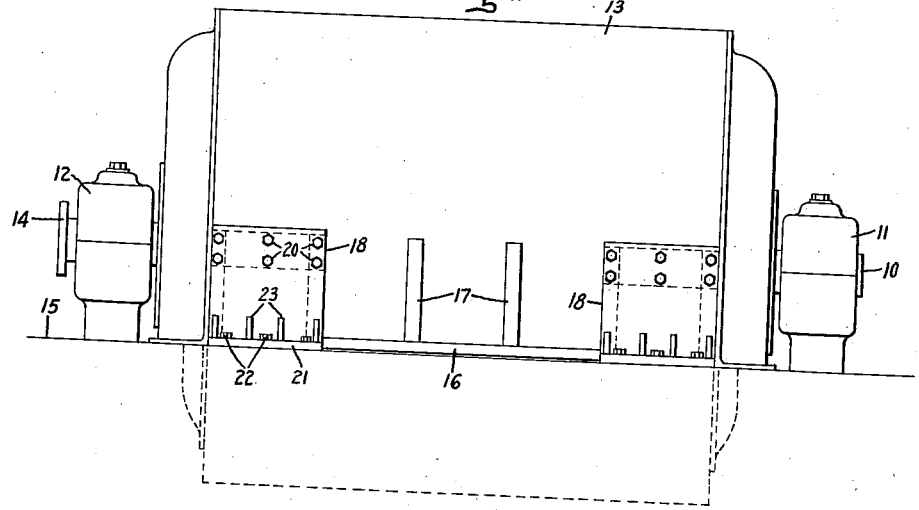
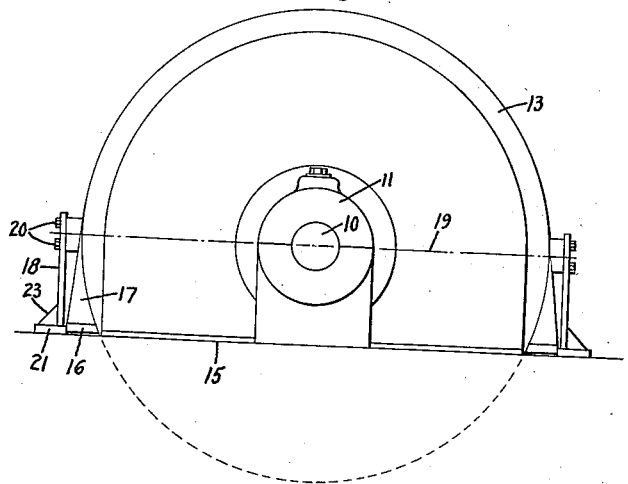      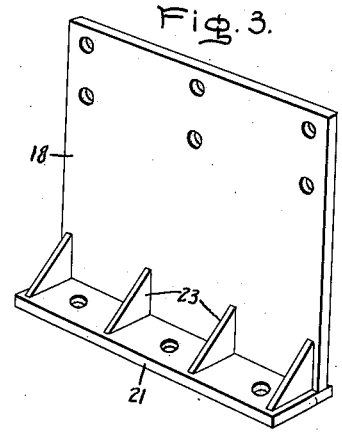
Inventor:
Winchester G. Blake,
by Harry E. Dunham
    Their Attorney.

Patented Oct. 15, 1940

2,217,788

UNITED STATES PATENT OFFICE 2,217,788

DYNAMOELECTRIC MACHINE

Winchester G. Blake, Woodside, N. Y., assignor to General Electric Company, a corporation of New York Application June 29, 1939, Serial No. 281,868

5 Claims. (Cl. 248—20)

My invention relates to improvements in dynamoelectric machines, and particularly to an arrangement for supporting such machines.

In certain types of dynamoelectric machines, considerable vibration may be set up in the stator of a machine by electromagnetic distortions which are created by the rotating magnetic field set up by the rotatable member of the machine. This is particularly noticeable in two-pole machines, wherein the rotatable member is excited to provide two magnetic poles which rotate within a stationary member of magnetic material. The magnetic attractive force tends to distort the stator into an elliptical form, and this deformation rotates within the stator frame producing two vibrations of the stator for each revolution of the rotor. If these vibrations are transmitted through the stator frame to the supporting foundation, the foundation and other equipment supported by the foundation may be subjected to undesirable destructive forces. Since the magnetic attractive force of the rotor is proportional to the square of the flux density, it is, therefore, always positive. This tends to produce an essentially radial distortion of the stator, so that a support secured to the stator at any point except at substantially a horizontal plane through the horizontal center line thereof will act angularly with respect to a horizontal supporting foundation. By supporting the stator frame flexibly along this horizontal plane to allow for radial displacement thereof, this component of force will not be transmitted to the supporting foundation. With the support for the stator frame on a horizontal plane through the horizontal center line thereof, substantially only horizontal forces will be transmitted to the support, and by providing supports which are rigid tangentially with respect to their point of connection to the stationary member and rigid longitudinally of the machine, the transmission of horizontal radial components of force to the foundation is substantially eliminated.

An object of my invention is to provide a dynamoelectric machine having an improved supporting arrangement.

Another object of my invention is to provide a flexible support for a machine subjected to vibratory forces to minimize the transmission of such forces to the supporting foundation.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevation of a dynamoelectric machine provided with an embodiment of my improved supporting arrangement; Fig. 2 is an end view of the machine shown in Fig. 1; and Fig. 3 is a perspective view of one of the supports shown in Figs. 1 and 2.

In the drawing, I have shown my invention in connection with a dynamoelectric machine having a rotatable member mounted upon a shaft 10. The rotatable member shaft 10 is supported by pedestal bearings mounted in bearing housings 11 and 12 arranged at each end of the machine. The rotatable member is provided with a magnetic core and an exciting winding and is arranged to react electrodynamically with the stationary member, which is provided with an armature winding arranged in a magnetic core mounted in a frame 13. A coupling 14 is secured to an end of the shaft 10 and is adapted to provide a driving connection for the rotatable member. The stationary member frame 13 is arranged to be supported upon a foundation 15 by supports including a bed plate 16 and upwardly extending legs 17 secured to the stator frame 13 on each side thereof. As explained above, in a two-pole machine of this type, there is a tendency for the stationary member to vibrate at twice the frequency of the speed of rotation of the rotatable member. In order to minimize the transmission of these vibrations to the foundation 15, I provide a flexible spring plate support adjacent each end of the machine, which includes an upwardly extending substantially perpendicular flexible plate 18 secured to the stationary member frame 13 along a diameter thereof substantially on a horizontal plane through the horizontal center line 19 of the stationary member. This plate 18 is secured to the stationary member by a plurality of screws or bolts 20, and is provided with a bed plate 21 which is welded to the upwardly extending plate 18 and secured to the foundation by a plurality of bolts or screws 22. In order to reinforce the flexible support, a plurality of gusset plates 23 is welded to the flexible plate 18 and to the bed plate 21.

By arranging one of these flexible supporting plates adjacent each end of the machine and on diametrically opposite sides thereof, the stationary member is supported substantially rigidly longitudinally thereof and substantially rigidly in a vertical tangential direction with respect to the point of connection between the flexible plate supports and the stationary member. These flexible supports are adapted to yield only in a substantially horizontal radial direction with respect to the stationary member under the magnetic attractive force of the rotatable member, and therefore, transmit substantially none of the vibrations to the foundation 15. The rigid supports provided by the bed plates 16 and legs 17, arranged intermediate the flexible supporting plates 18, are arranged with a slight clearance between the lower surface of the bed plate 16 and the uper surface of the fundation 15. These additional supports provide an arrangement for supporting the machine if there is any tendency for the flexible supports to yield vertically, and also provide stops which limit the vertical movement of the stationary member with respect to the foundation 15. It is thus seen that I have provided a flexible support for the stationary member of a dynamoelectric machine which is adapted to support the machine rigidly longitudinally thereof and provide radial flexibility for minimizing the transmission of vibrations from the machine to the supporting foundation.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member, means for supporting said stationary member substantially rigidly longitudinally and in a vertical tangential direction and adapted to yield only in a substantially horizontal radial direction with respect thereto, and other means for supporting said rotatable member.

2. A dynamoelectric machine having a rotatable member and a stationary member, means including plate springs for supporting said stationary member substantially rigidly in a vertical tangential direction, said plate springs extending upwardly and being constructed to yield only in a substantially horizontal radial direction with respect to said stationary member, and other means for providing an additional support to said stationary member.

3. A dynamoelectric machine having a stationary member and a rotatable member, and supporting means including plate spring supports adjacent the ends of said stationary member secured thereto on substantially diametrically opposite sides thereof, said plate springs being constructed to yield only along a line substantially radial of said stationary member through the points of connection of said stationary member with said spring plate supports.

4. A dynamoelectric machine having a stationary member and a rotatable member, and supporting means including yieldable means arranged adjacent each end of said stationary member and connected thereto on substantially diametrically opposite sides thereof, said yieldable means being adapted to yield only along a line substantially radial of said stationary member through the points of connection of said stationary member with said yieldable means.

5. A dynamoelectric machine having a rotatable member and a stationary member, means for supporting said rotatable member, means including plate supports arranged adjacent each end of said stationary member and on substantially diametrically opposite sides thereof adapted to yield only in a substantially radial direction with respect to the points of connection of the stationary member thereto for supporting the same, said plate supports being secured to said stationary member substantially on a horizontal plane through the horizontal center line of said stationary member, and means intermediate said plate supports for providing additional supports for said stationary member.

WINCHESTER G. BLAKE.